March 31, 1964     H. PASCHKE     3,126,580
APPARATUS FOR CONTINUOUSLY DEFORMING THERMOPLASTIC FOILS
Filed July 25, 1961     2 Sheets-Sheet 1

Inventor:
Heinrich Paschke
By Watson Cole Grindle & Watson
Attys.

March 31, 1964    H. PASCHKE    3,126,580
APPARATUS FOR CONTINUOUSLY DEFORMING THERMOPLASTIC FOILS
Filed July 25, 1961    2 Sheets-Sheet 2

Inventor:
Heinrich Paschke
By Watson, Cole, Grindle + Watson
Attys.

United States Patent Office 3,126,580
Patented Mar. 31, 1964

3,126,580
APPARATUS FOR CONTINUOUSLY DEFORMING THERMOPLASTIC FOILS
Heinrich Paschke, Dusseldorf, Germany, assignor to Firma Rheinmetall G.m.b.H., Dusseldorf, Germany
Filed July 25, 1961, Ser. No. 126,633
Claims priority, application Germany July 27, 1960
8 Claims. (Cl. 18—10)

The invention relates to an apparatus for continuously deforming, for example patterning, thermoplastic foils by means of one or more rotating hollow cylinders adapted to be evacuated internally and perforated at the periphery and on which there is a suitably engraved or embossed mould which is advantageously interchangeable and preferably provided with apertures at its depressions and on which the heated foil, which is cooled after it has been deformed, rests.

In such arrangements, care must be taken that the vacuum is not impaired or destroyed at that part of the periphery of the hollow cylinder which is not covered by the foil owing to air flowing from outside into the internal space of the cylinder connected to the vacuum pump or vacuum installation.

According to a known constructional form, this is intended to be prevented by means of an endless solid rubber belt guided over rollers, which is brought to bear against the inside of the wall of the cylinder by its own tension and is intended to seal off from the outside those openings in the cylinder and the mould which are not covered by the foil.

A certain disadvantage of this form of construction consists in that the solid rubber belt mentioned is not always able, even when subjected to high initial tension, to conform to the contours of the cylinder wall with the necessary close fit and the required pressure, so that consequently an adequate seal is possibly not attained between the inner space of the drum and the outside air. A further drawback is to be seen in that the endless solid rubber belt cannot be altered as regards its effective length and, consequently, is always able to cover only a very definite area of the internal periphery of the hollow cylinder; in other words, therefore, in the known case the area to be covered can be neither enlarged nor reduced.

The invention avoids the disadvantages mentioned above in broad outline. It differs from the known constructions in particular in that the covering device consists of an elastic inflatable body arranged in the hollow cylinder.

In a preferred embodiment according to the invention, this inflatable body is an endless inflated flexible tube made of plastic, synthetic rubber, natural rubber or other suitably elastic material, which is guided over rollers and has one of its runs bearing with a sealing action against the inside of the cylinder at the place to be sealed. The filling medium may consist of air or gas of suitable pressure or else partly of gas or air and partly of liquid, for example water or a heavy liquid, brine and the like. The contact pressure due to the inflation pressure can be influenced within wider limits by the water ballast, the material of the flexible tube being especially protected.

With the above characterised construction of the covering device, the advantage is obtained that, since the flexible rubber tube is in fact substantially more elastic than a solid rubber belt, it always conforms with a close fit and with an adequate tension pressure to the inside of the wall of the cylinder, so that a satisfactory sealing action is obtained under all conditions and even when there is a comparatively large interval between the individual supporting rollers.

As a further development of the object of the invention, the above-mentioned inflatable body is mounted on a spreader in order in this way to provide the possibility of altering its covering length in the direction of the periphery of the cylinder.

Said spreader consists with advantage of two arms articulated to one another at one of their ends and adapted to be spread apart around the joint, said arms having at each of the free ends and the joint a roller or the like over which the endless inflated flexible rubber tube is guided. These arms can be spread or drawn together to a greater or lesser extent by suitable means, whereby the covering length of the rubber tube is altered.

According to a preferred embodiment, a spreading arm acts on the spreading joint, said spreading arm resting with its free end against an eccentric disc by the adjustment of which the arm is urged in the direction of the inside of the cylinder wall and in so doing spreads the spreading arms. At the same time, the arms may be subjected to the action of a tension spring which draws them together again suitably when the pressure of the eccentric abates.

Instead of an eccentric arrangement, other means, for example spindles or hydraulic or pneumatic operating cylinders, may also be employed for actuating the spreader.

Embodiments of the invention are illustrated in the drawing, in which.

Figure 1:
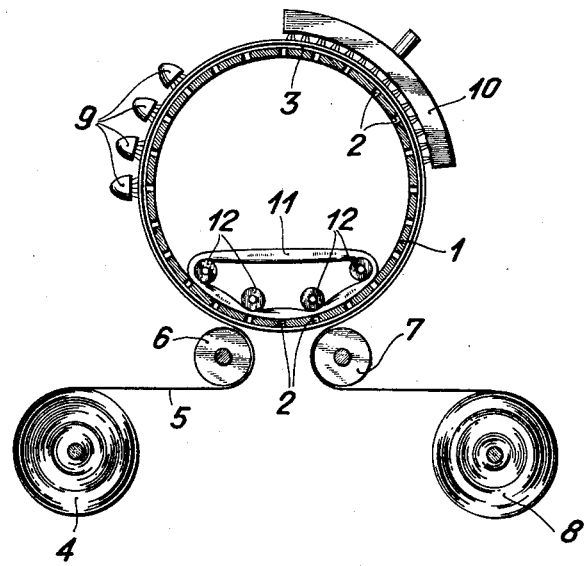
FIG. 1 shows, partly in cross-section, an embodiment arranged for deforming foils.

In the embodiment according to FIG. 1, there is provided a rotating hollow cylinder 1 having holes 2 in its periphery. On the outer periphery of the hollow cylinder there are mounted one or more moulds or patterns 3 which carry a pattern to be applied to the foil, that is the design required, and preferably are in communication with the internal space of the hollow cylinder 1, which is under vacuum, by way of bores at the deepest parts of said pattern, that is of the individual moulding pockets or positions.

The foil to be provided with the pattern in question runs off from a feed drum 4 in the form of a band 5. In this process, the latter first passes over a guide roller 6, is then led over the mould or moulds or patterns mounted on the periphery of the cylinder and finally leaves the cylinder 1 by way of the guide roller 7. Thereafter, the band is wound, for example, onto a drum 8.

Infrared heaters 9 or other heaters are provided at a distance from the foil and the moulds 3 and provide for the plasticising of the band of foil 5. Moreover, a cooling device 10 is provided by means of which cooling air is blown against the band of foil which has meanwhile been patterned or deformed and in this way said band is set.

So that the foil may conform to the contours of the mould as far as possible with a close fit, the hollow cylinder 1 is evacuated in known manner. In this way, the band of foil conforms under the differential pressure to the recesses in the mould 3, i.e., therefore, to the moulding pockets or moulding contours, and is permanently shaped or deformed at these points.

According to the invention, in order to prevent outside air flowing into the interior of the cylinder at the zone located between the rollers 6, 7 by way of the openings in the cylinder and the moulds disposed in this zone and so impairing or destroying the vacuum, a sealing device in the form of an endless air-filled flexible tube 11 led over guide and pressure rollers 12 is provided inside the cylinder. In the embodiment according to FIGURE 1, four rollers 12 are provided for guiding the flexible tube. These may be either stationary or arranged so that their location can be varied. In the latter case, the advantage of a particularly large range of regulation of the contact pressure is obtained and also, as will be shown hereinafter, the advantage of adjustment of the effective sealing air of the sealing device.

Figure 2:
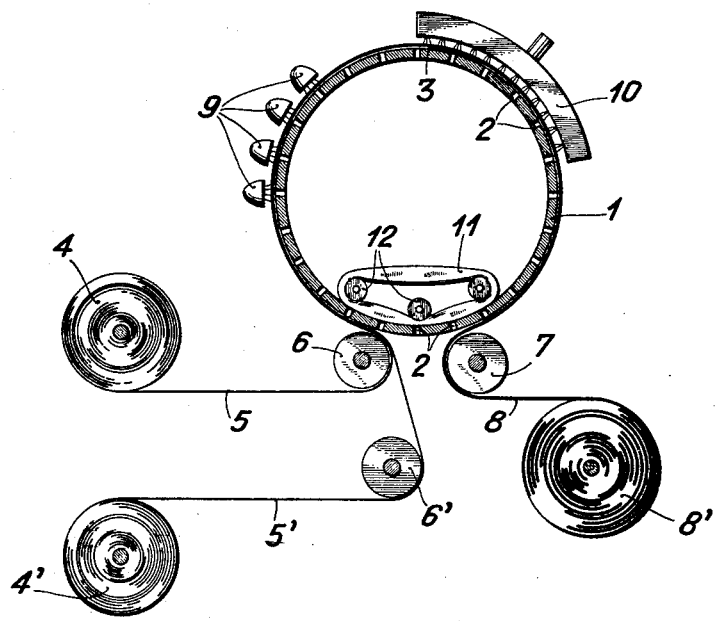
FIG. 2 shows a similar embodiment partly in section, but arranged for backing two foils disposed one above the other.

The constructional form according to FIGURE 2 corresponds in all its essential parts to that according to FIGURE 1, except that this apparatus is arranged for the backing, i.e., bonding, of two bands of foil 5, 5' running off from the drums 4, 4'. The guiding of the band of foil 5' is effected by the guide roller 6'. After passing over the directing or guide rollers 6, 6', the bands of foil 5, 5' run together around the cylinder 1 and the interchangeable moulds 3 mounted on said cylinder, are plasticised in the zone where the heaters 9 are located and are heated to such an extent in this process that they are bonded to one another under the contact pressure produced by the vacuum, so that after passing through the cooling device the two foils are combined to form a composite band 8 which is wound on the storage drum 8'.

Figure 3:
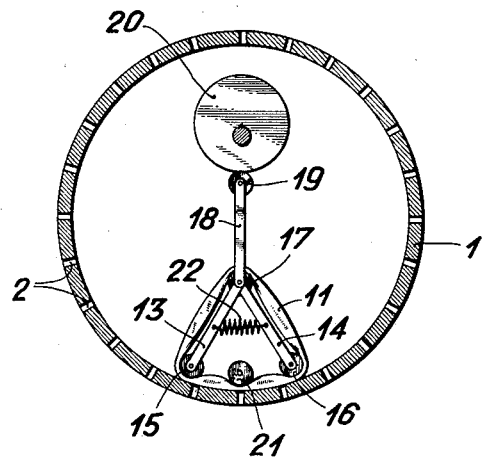
FIG. 3 illustrates, partly in section and partly in end view, another constructional form comprising a spreader, shown in the basic position, for the sealing body.
Figure 4:
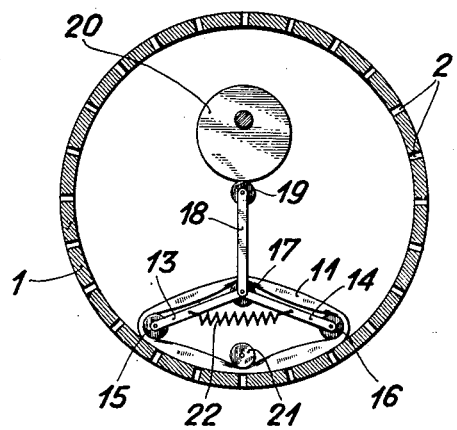
FIG. 4 shows the embodiment according to FIGURE 3 with the spreader for the sealing body in the extreme spread position.

According to the embodiment shown in FIGURES 3 and 4, in order to be able to adapt the effective length or area of the sealing portion of the sealing body or flexible tube 11 to the particular peripheral length to be sealed at the inside of the wall of the cylinder, the flexible tube 11 is guided over a spreading device which consists of the two arms 13, 14, each of which has a guide roller 15, 16 at its free end and which are articulated at their other end. This joint carries a guide roller 17. A radial arm 18 acts on the joint, said arm bearing at its free end, which advantageously carries a roller, against the periphery of an eccentric 20. The flexible tube 11 is guided over the rollers 15 to 17 of the spreader. Between the two rollers 15, 16, there is another guide roller 21 which may be either stationary or adjustable in height independently of the rollers 15, 16.

If required, the arms 13, 14 are connected to one another by means of a tension spring 22 which draws them towards one another according to the reduction in the pressure of the eccentric when said eccentric 20 is moved back into its initial position or into an intermediate position. Thus, in this construction there is the possibility of adjusting the length of the sealing portion of the flexible tube 11 in a simple manner and, if required, during operation, so that it is therefore possible with the arrangement according to the invention to adapt the assembly to the requirements of operation in a particular instance. Apart from this the result obtained with the embodiments according to FIGURES 3 and 4 is, inter alia, that the flexible tube element is applied with considerable pressure against the inner surface to be sealed in the hollow cylinder 1, so that by applying the measures according to the invention allowance is made for the most diverse operating conditions and a satisfactory sealing action is obtained even when the mutual distance of the supporting rollers 15, 16, 21 from one another is rather large.

What I claim is:
1. Apparatus for continuously deforming, backing and the like treatment of thermoplastic foils, comprising a rotating hollow cylinder adapted to be evacuated internally and perforated with openings at the periphery and having at least one interchangeable mould disposed thereon, a pair of spaced rolls over which the foil is guided to and from the mould, and an internally arranged seal sealing the openings in the hollow cylinder which are free from the mould approximately between the rolls at any given time from the inside, the seal consisting of an elastic inflatable body capable of changing its shape when inflated.

2. Apparatus according to claim 1, in which a plurality of rollers are provided in the cylinder and the inflatable body is an endless inflated flexible rubber tube which is guided over the rollers which serve to press one of its runs against the inside of a wall of the hollow cylinder.

3. Apparatus according to claim 1, in which a plurality of rollers are provided in the cylinder and the inflatable body is an endless inflated flexible rubber tube which is guided over the rollers which serve to press one of its runs against the inside of a wall of the hollow cylinder, the rollers being adjustable in the direction along the inside of the cylinder wall.

4. Apparatus according to claim 1, in which a spreader is provided on which the inflatable body is mounted for the purpose of increasing its effective covering length in the direction of the internal periphery of the cylinder.

5. Apparatus according to claim 1, in which a spreader is provided on which the inflatable body is mounted for the purpose of increasing its effective covering length in the direction of the internal periphery of the cylinder, articulated to one another at one of their ends and adapted to be spread apart, and in which a pair of arms are provided pivoted to each other at one end with a free end at the other ends thereof, said arms having at their free ends and at the spreading pivot joint rollers over which the elastic inflatable body is guided.

6. Apparatus according to claim 1, in which a spreader is provided on which the inflatable body is mounted for the purpose of increasing its effective covering length in the direction of the internal periphery of the cylinder, articulated to one another at one of their ends and adapted to be spread apart, and in which a pair of arms are provided pivoted to each other at one end with a free end at the other ends thereof, said arms having at their free ends and at the spreading pivot joint rollers over which the elastic inflatable body is guided, and in which a radial arm is provided acting on the spreading joint, said radial arm resting with its free end against an adjustable eccentric.

7. Apparatus according to claim 1, in which a spreader is provided on which the inflatable body is mounted for the purpose of increasing its effective covering length in the direction of the internal periphery of the cylinder, articulated to one another at one of their ends and adapted to be spread apart, and in which a pair of arms are provided pivoted to each other at one end with a free end at the other ends thereof, said arms having at their free ends and at the spreading pivot joint rollers over which the elastic inflatable body is guided, and an arm attached to a crank provided for the purpose of opening and closing the spreader.

8. Apparatus according to claim 1, in which a spreader is provided on which the inflatable body is mounted for the purpose of increasing its effective covering length in the direction of the internal periphery of the cylinder, articulated to one another at one of their ends and adapted to be spread apart, and in which a pair of arms are provided pivoted to each other at one end with a free end at their other ends thereof, said arms having at their free ends and at the spreading pivot joint rollers over which the elastic inflatable body is guided, and in which a spring is provided connected to the spreading arms.

References Cited in the file of this patent
UNITED STATES PATENTS

| 2,526,318 | Battin | Oct. 17, 1950 |
| 2,660,757 | Smith et al. | Dec. 1, 1953 |
| 2,776,451 | Chavannes | Jan. 8, 1957 |
| 3,004,289 | Missbach | Oct. 17, 1961 |